United States Patent
Frensch (10) Patent No.: US 7,183,961 B2
(45) Date of Patent: Feb. 27, 2007

(54) SYSTEM FOR CONVERTING ANALOG VIDEO SIGNALS TO DIGITAL VIDEO SIGNALS

(75) Inventor: Jochen Frensch, Villingen-Schwenningen (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 10/205,589

(22) Filed: Jul. 25, 2002

(65) Prior Publication Data

US 2003/0067559 A1 Apr. 10, 2003

(30) Foreign Application Priority Data

Jul. 27, 2001 (DE) .......................... 101 36 677

(51) Int. Cl.
*H03M 1/12* (2006.01)

(52) U.S. Cl. ....................................... 341/155
(58) Field of Classification Search ................ 341/155, 341/131, 118; 348/572, 573
See application file for complete search history.

(56) References Cited

U.S. PATENT DOCUMENTS

| | | | | |
|---|---|---|---|---|
| 5,245,341 A | * | 9/1993 | Maeder | ....................... 341/155 |
| 5,550,594 A | | 8/1996 | Cooper et al. | ............... 348/513 |
| 5,990,968 A | | 11/1999 | Naka et al. | .................. 348/537 |
| 6,097,444 A | * | 8/2000 | Nakano | ....................... 348/607 |
| 6,313,881 B1 | | 11/2001 | Reinhart et al. | ............ 348/572 |
| 6,490,005 B1 | * | 12/2002 | Steinbach | .................... 341/155 |
| 6,816,171 B2 | * | 11/2004 | Kim | ........................... 345/699 |

FOREIGN PATENT DOCUMENTS

EP 0291036 A2 * 11/1988

* cited by examiner

*Primary Examiner*—Brian Young
(74) *Attorney, Agent, or Firm*—O'Shea Getz & Kosakowski, P.C.

(57) ABSTRACT

A system for converting analog video signals to digital video signals receives an analog video signal that generates a reference horizontal synchronization signal. A phase-locked loop receives the reference horizontal synchronization signal and generates a pixel clock signal and a horizontal synchronization signal from the reference horizontal synchronization signal. An analog-to-digital converter converts the analog video signals to digital video signals. Differences between the measured values of the sampling of a test line of adjacent pixels are formed and phase parameters of the different phase positions are generated by summation of these differences. A phase position of the video signal from the phase parameters is determined, and the phase position is determined with the set phase position, and based on the comparison the set phase is changed.

17 Claims, 4 Drawing Sheets

SYSTEM FOR CONVERTING ANALOG VIDEO SIGNALS TO DIGITAL VIDEO SIGNALS

CLAIM OF PRIORITY

This patent application claims priority to German patent application DE 101 36 677.9 filed on Jul. 27, 2001.

FIELD OF THE INVENTION

The invention relates to the field of converting analog video signals to digital video signals.

RELATED ART

In order to reproduce an analog RGB image on a digital display, analog-to-digital conversion is required. The quality of this image display depends upon the pixel precision of on the pixel precision of this conversion. Otherwise the reproduction of the fine vertical line structures is inadequate. If the sampling frequency does not correspond to the pixel frequency, sampling outside the minimum and maximum video signal values causes false minima and maxima to be recognized which agree neither in their absolute value nor in their phase with the actual values.

Another problem is the selection of the sample phase when the sampling frequency does not correspond to the pixel frequency. Errors in selection of the sampling phase are manifest themselves most clearly in images with sharp, vertical edges such as those found on navigation charts, etc. Therefore, to evaluate the selected phase position, a test line with alternating black and white pixels may be utilized. If, in the extreme case, with a uniformly periodic test line, the phase position lies precisely between the minima and maxima, matching gray tones are determined, in a sine curve, for example, and the test line is thus reproduced as a gray line.

To minimize such problems, the synchronization signals determining the time of the sample are first modulated upon the actual RGB signal to minimize the skew between video content and control signals. In addition, the lines generated by the source are generated with a precisely defined number of pixels, thereby enabling the receiving module to regenerate the precise pixel frequency of the line frequency by appropriate multiplication. To enable selection by the receiving module of the phase position between the recovered synchronization signal and the RGB signal, a defined test signal which preferably contains a change between the maximum and minimum RGB amplitude from one pixel to the next i.e., an alternating sequence of white and black pixels, is tagged by the source.

Since the sampling frequency is generated based on knowledge of the exact pixel number per line and corresponding multiplication of the line frequency by a phase-locked loop (PLL), the optimum sampling phase must still be determined from the sampling signal.

The goal of the invention is therefore to create, preferably at relatively low expense, a technique for converting analog video signals to digital video signals which enable precise determination of the phase position between the recovered synchronization signal and the RGB signal.

SUMMARY OF THE INVENTION

The basic principle of the invention is to determine the actual phase position of the RGB signals by finer and finer sampling with different phase positions, and by qualitative evaluation of the measured values through formation of suitable parameters. For this purpose, sampling of the pixels of a test line is effected with preferably alternating white and black pixels at a frequency that is n times the pixel frequency. As a result, n sampling values with fixed phase positions are obtained for each pixel. The parameters for the individual phase positions are determined by forming the difference between the measured values of adjacent pixels and summing these differences. These parameters thus contain information on the relative phase position between the recovered synchronization signal and the RGB signal, which information may then be evaluated.

In order, for example, to counteract Hsync jitter, that is, a phase fluctuation of the Hsync signal while still precisely determining the sampling instant to a fraction of a sampling period, multiple lines rather than simply the test line are preferably employed for the calibration. This action may be effected, specifically, by low-pass filtering.

According to the invention, readjustment of the sampling instant may be omitted if it is determined that no image is present with the relevant sharp, vertical lines, and that, as a result, the problems referred to in the preamble are not relevant.

The technique according to the invention may be implemented, specifically, by double or triple oversampling. Each pixel is thereby subdivided into two or three phase segments which are each written by a phase register, such that during a readjustment the phase register value of the sampling phase is correspondingly incremented or decremented in steps.

DETAILED DESCRIPTION OF THE INVENTION

Figure 3:
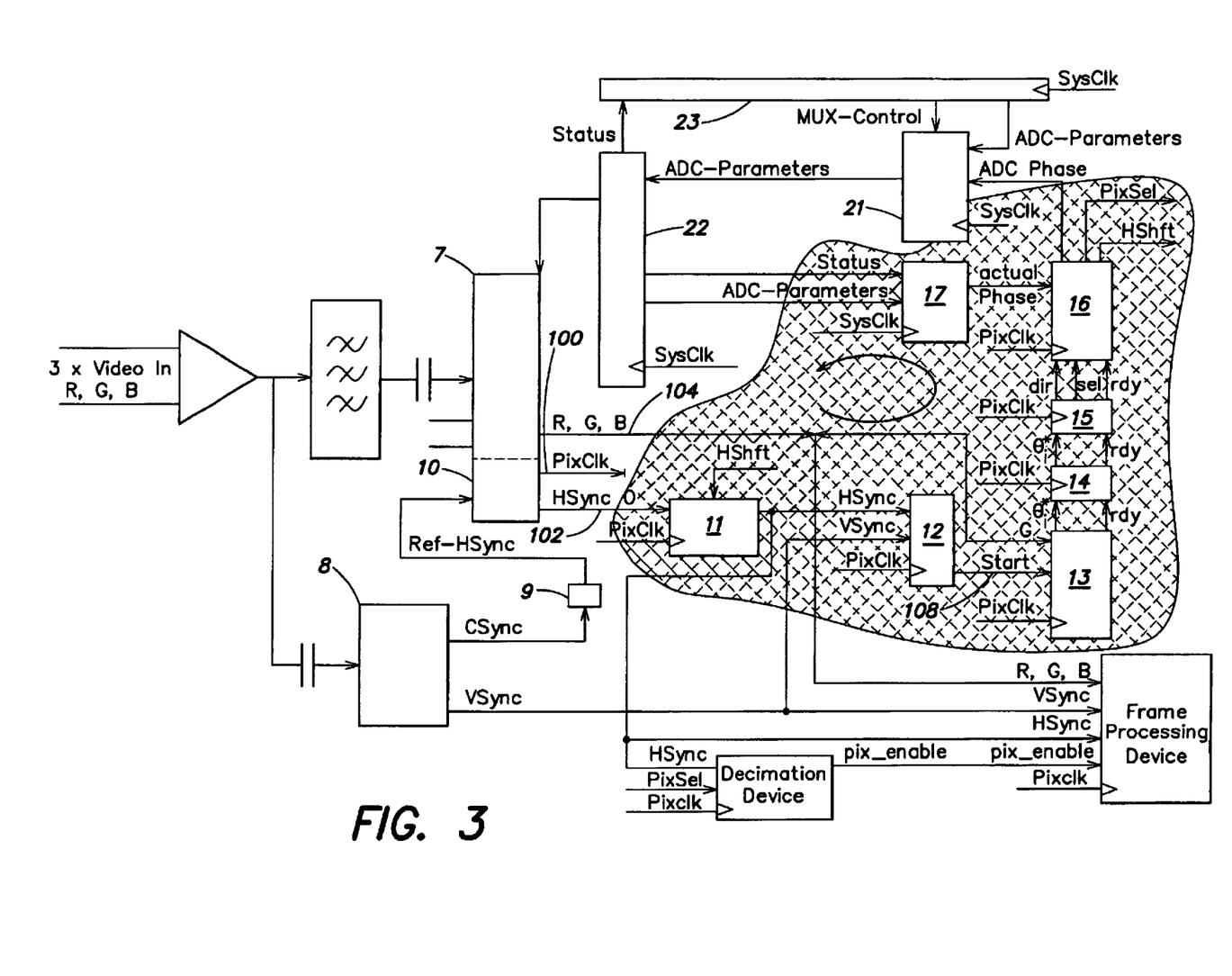
FIG. 3 shows the design of a system according to the invention for implementing a method according to the invention.

In FIG. 3, analog video signals are input through an input circuit to an analog-to-digital converter 7 and a synchronization separator 8. A reference horizontal synchronization signal is formed by synchronization separator 8 via an interface filter 9, the signal being input to a PLL (phase-locked loop) 10. From this signal, and with knowledge of the pixel number per line, the PLL 10 forms a pixel clock signal PixClk on a line 100 and a horizontal synchronization signal Hsync on a line 102. The analog-to-digital converter 7 relays a digital video signal RGB on a line 104 to a frame processing device 13, and from this, the green signal G to an evaluation unit 14. Via an adjustment device 11 for shifting horizontal synchronization signal HSync as a function of a horizontal shift signal HShft, horizontal synchronization signal HSync is fed to a detection device 12 to establish the beginning of a test line. The detection device 12 inputs a start signal Start on a line 108 to the evalution device 13 which then picks up pixel clock signal PixClk on the line 100 in addition to the green signal G on the line 104. Phase parameters θi are computed in evaluation device 13, from which parameters averaged phase parameters $θ*_i$ are computed by averaging multiple lines, the averaged parameters being referenced in a following signal phase determination device 15 to determine the phase position, wherein this phase position is in turn compared in a following device for generating an analog-to-digital converter phase 16, with a currently set phase position of the analog-to-digital converter, from which, among other things, horizontal shift signal HShft and a modified phase position of the analog-to-digital conversion are defined. The subsequent circuit components 17, 21, 22, 23 have the function of precise readjustment and serve as the interface to a microprocessor.

Figure 1:
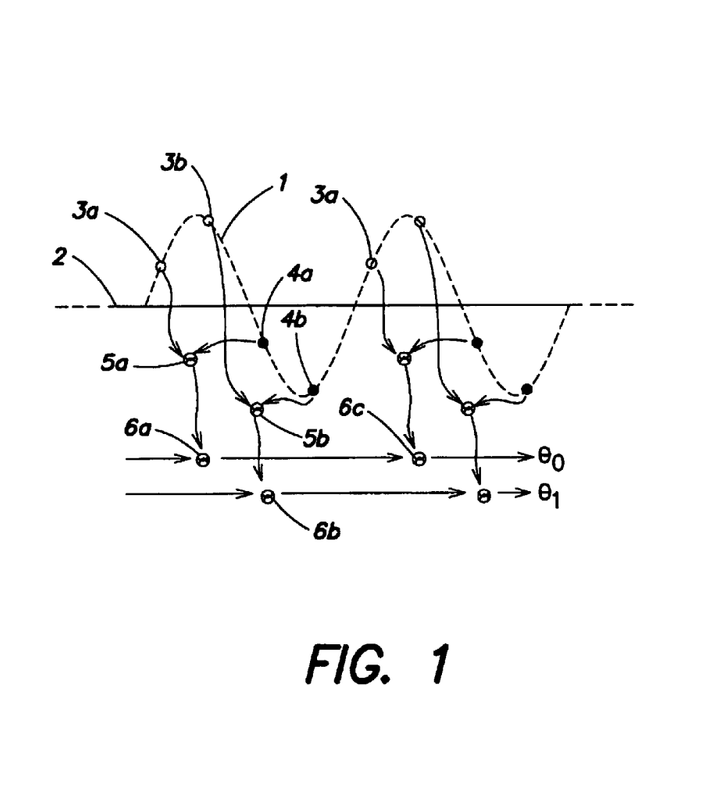
FIG. 1 is a timing diagram for a measured signal in a first embodiment of the invention with double oversampling.
Figure 2:
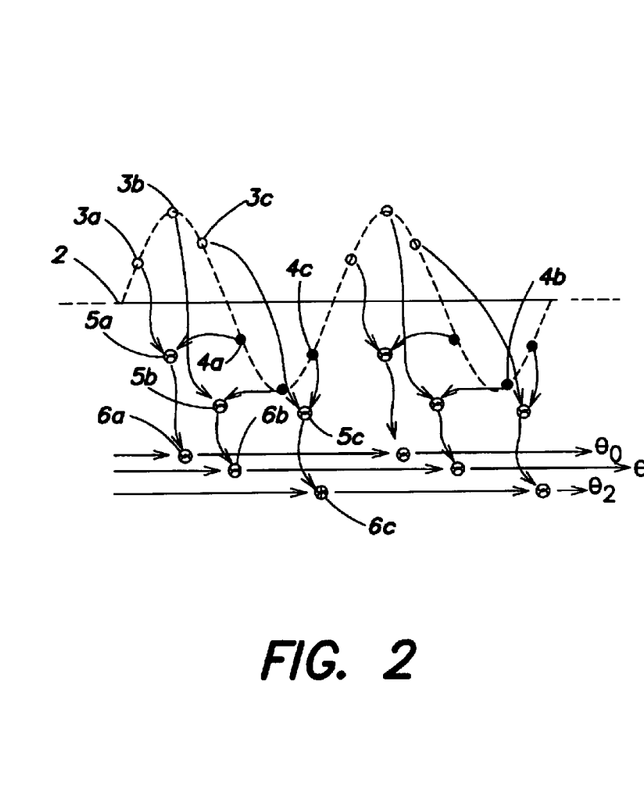
FIG. 2 is a timing diagram for a measured signal in another embodiment of the invention with triple oversampling.

In evaluation device 13, the lines of digital green video signal G are read out at the nth pixel frequency. Out of one test line, preferably the last line before the active image and alternating white and black pixels, n measured values are sampled per pixel. FIG. 1 shows an example in which n=2, while FIG. 2 shows an example in which n=3. The detection device 12 establishes the beginning of the test line and outputs the start signal Start to the evaluation unit.

Through multiplication, n measured values are obtained for each pixel at corresponding phase positions. The basis of the method is that, in each case, measured values of the same phase positions of white and black pixels are subtracted from each other and these differences are summed to form phase parameters $θ_i$ over the entire test line. For this purpose, the measured values of adjacent pixels are subtracted from each other.

In principle, according to the invention, the phase position may be determined simply from these phase parameters. This phase position is then optimized for the test line. A remaining problem, however, is the phase shift of the HSync signal generally known as jitter. Regeneration by the PLL of the pixel clock signal already counteracts this jitter; however, since the sampling instant still needs to be aligned to the fraction of a sampling period, it is appropriate not only to use the current test line for calibration but to average multiple lines. This averaging may be performed, specifically, by including the lines of the active image so that an optimized sampling instant is determined averaged over the active image.

This averaging is effected by low-pass filtering. Especially suited for this purpose is an FIR filter of the Nth order, the coefficients of which are all 1, that is $$H_1(z) = \sum_{i=0}^{N} Z^{-i} = \frac{1 - Z^{-(N+1)}}{1 - Z^{-1}}$$

This filter may be implemented, for example, with N=15. A relatively low level of production expense may be achieved with IIR filters. Specifically, the following form may be selected:

$$H_2(z) = \frac{1 + Z^{-1}}{1 - (1 - 2^p)z^{-1}}$$

From the $θ*_i$, the actual phase position may be determined mathematically, and the sampling phase of the analog-to-digital converter corrected accordingly.

Since the implementation expense is relatively high, however, especially for mathematical operations such as division and arctangent formation, and the analog prefilter would have to be designed so that the analyzed test signal already sufficiently approximates a sine curve, the method may be drastically simplified. While the readjustment takes somewhat longer in this case, this is generally not a problem since a readjustment is rarely required given a sampling phase that is already properly adjusted.

This simplified method determines only whether, and if so, in which direction the sampling phase must be adjusted. The readjustment is then effected by a phase register in minimum increments predetermined by analog-to-digital converter 7.

Figure 4:
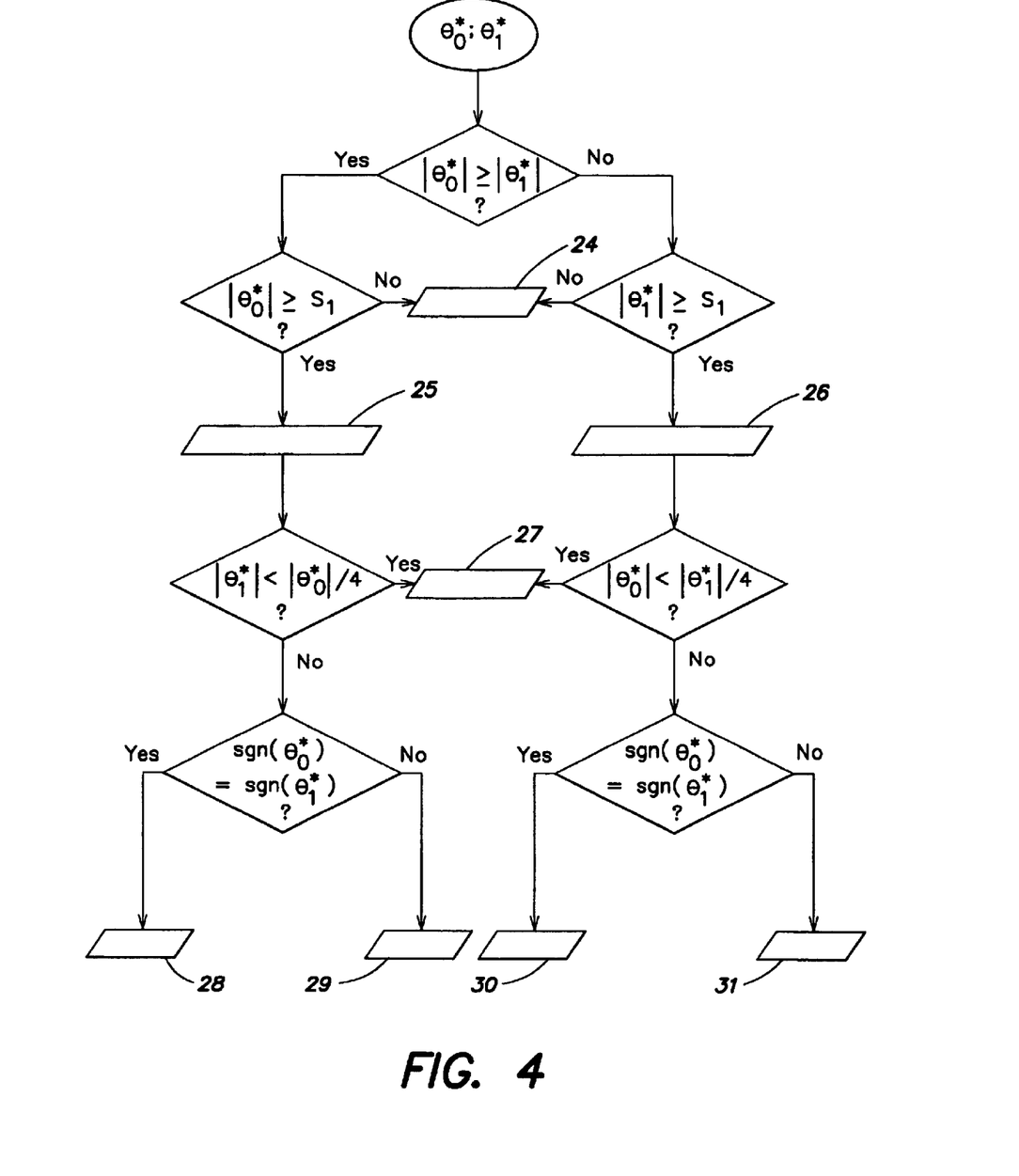
FIG. 4 is a flowchart of a method according to the invention in one embodiment of the invention.
Figure 5:
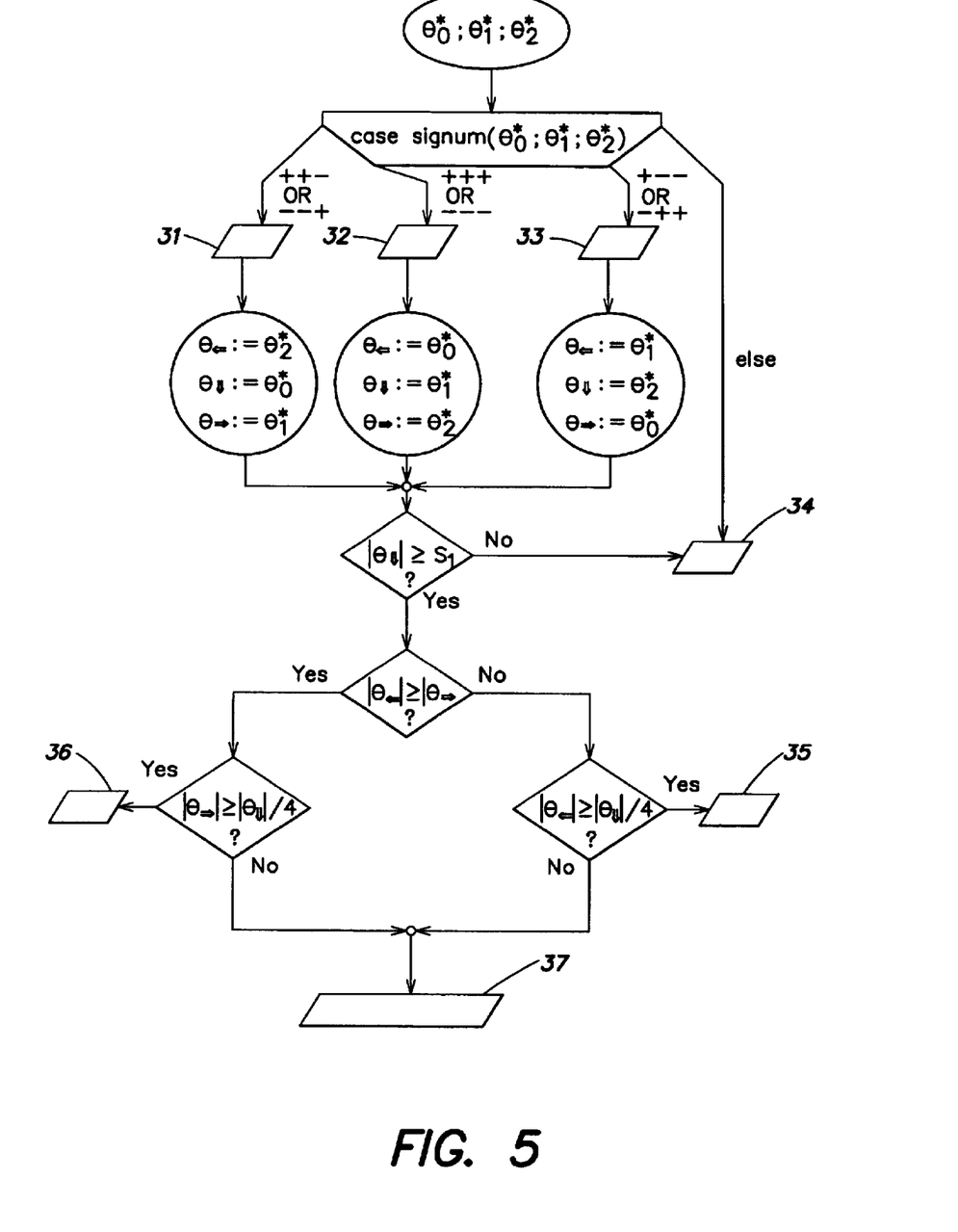
FIG. 5 is a flowchart of a method according to the invention in another embodiment of the invention.

Evaluation of the averaged phase parameters $θ*_i$ proceeds by the following steps which are shown in FIGS. 4 and 5 for cases n=2 and n=3:

1. An assessment is made as to whether an image with sharp, vertical lines is present. If not, all instantaneously made settings are maintained.
2. If such an image with sharp, vertical lines is present, an assessment is made as to what the best sampling phase is.
3. An assessment is made as to whether a readjustment of the sampling phase is required.
4. If a readjustment is required, a decision is made as to the direction in which to change the phase position.

In the embodiment of FIG. 4 where n=2, a comparison of the values of the averaged phase parameters first determines which of the two phase positions better fits the maxima and minima of the video signal curve 1 (FIG 1) of the measurement signal assumed to be a sine curve (green). The better phase position is taken to be the greater phase parameter based on the absolute value. The better phase parameter is subsequently compared with a limit S and, if the limit is not reached, step 24 decides that no relevant sharp, vertical lines, or an insufficient number of such lines, are present in the image, and that consequently there is no adjustment requirement.

Otherwise, the phase position whose averaged phase parameter has the higher absolute value is selected as best by steps 25, 26. Subsequently, based on a quantitative comparison of a quarter of the absolute value of the better averaged phase parameter selected with the absolute value of the other phase parameter, a decision is made as to whether the phase position has already been sufficiently optimized. In this case, step 27 decides that the phase position will not be changed. Otherwise, optimization of the sampling phase continues, whereby the signs of the phase parameters are compared, and if agreement is found, the sampling phase is shifted in steps 28 and 31 (when the first sampling is selected and the signs are equal, or when the second sampling is selected and the signs are not equal) by a predetermined value to the right, and in the other cases accordingly in blocks 29 and 30 is shifted by a predetermined value to the left.

In the embodiment of FIG. 5 where n=3, first the sign of the averaged phase parameter $θ*_i$ is determined, and in the cases indicated in block 31 (when the signs of the first two samplings are equal and different from the third sampling) the first sampling is selected; in block 32 (when all signs are equal) the second sampling is selected, and in block 33 (when the signs of the last two samplings are equal and different from the first sampling) the third sampling is selected. In all other cases, as in block 34, it is then recognized that no relevant image with sharp, vertical edges is present and no change is made. Subsequently, a new check is made in the first three cases as to whether the absolute value of the phase parameter of the best sampling $|θ*|$ has reached or exceeded a predetermined limit S. If this is not the case, no change is made, as in block 34.

If a change must be made, the absolute values of the (averaged) phase parameters of the subsequent sampling|θ*⇒| and the prior sampling |θ*⇐| are compared, and the smaller value is in turn compared with a quarter of the absolute value of the phase parameter of the best sampling. If the smaller value is below this absolute value, the phase position is not changed as in step 27; otherwise a shift occurs in step 36 to the right (if the absolute value of the previous phase parameter is greater that that of the following phase parameter), the shift otherwise occurring in block 35 to the left.

A five-digit digital number may be used, for example with values between 0 and 31 for the phase register. The phase register is incremented or decremented by 1 according to the above instruction. For transitions 0→31 and 31→0, it should be noted that the phase segment of the relevant sampling has been left and that the corresponding adjacent sampling has been selected. Thus, given n=2 and n=3 from the value 31 of the first sampling, and given an increment of 1, the value 0 must be taken from the second sampling. Given a value of 31 from the second sampling, for an increment of 1, the value 0 of the third sampling must be taken. In addition, given a change from the second to the first sampling (for n=2) and from the third to the first sampling (for n=3), the next pixel is selected. This is taken into account by adjustment device 11 for the shift of the Hsync signal. Via the HShft signal, and the latter is prompted to delay the Hsync signal for all on the input side by 0, 1, and 2 pixel-clock pulses; the start value after a reset is always 1. This results, first of all, in a negative shift, and secondly, in the fact that, for the next frame, the algorithm provides a result that lies in a noncritical region since all sampling values have been shifted by one pixel-clock pulse. This corresponds to a control region of the duration of one complete pixel.

The process may be illustrated in a table as follows:

| Given n = 2 | | |
|---|---|---|
| A/D phase transition | For the 1$^{st}$ sampling | For the 2$^{nd}$ sampling |
| 0 → 31 | → 2$^{nd}$ sampling HShft + 1 | → 1$^{st}$ sampling HShft 0 |
| 31 → 0 | → 2$_{nd}$ sampling HShft 0 | → 1$^{st}$ sampling HShft − 1 |

| Given n = 3 | | | |
|---|---|---|---|
| A/D phase transition | 1$^{st}$ sampling | 2$^{nd}$ sampling | 3$^{rd}$ sampling |
| 0 → 31 | → 3$^{rd}$ sampling HShft + 1 | → 1$^{st}$ sampling HShft 0 | → 2$^{nd}$ sampling HShft 0 |
| 31 → 0 | → 2$^{nd}$ sampling HShft 0 | → 3 sampling HShft 0 | → 1$^{st}$ sampling HShft − 1 |

LIST OF REFERENCE SYMBOLS 1. video signal curve
2. center line
3a. measured value of the white pixel in the first phase position
3b. measured value of the white pixel in the second phase position
3c. measured value of the white pixel in the third phase position
4a. measured value of the black pixel in the first phase position
4b. measured value of the black pixel in the second phase position
4c. measured value of the black pixel in the third phase position
5a. measured value of the black pixel in the first phase position
5b. measured value of the black pixel in the second phase position
5c. measured value of the black pixel in the third phase position
6a. difference of the first measured values
6b. difference of the second measured values
6c. difference of the third measured values
7. analog-to-digital converter
8. synchronization separator
9. interface filter
10. PLL
11. adjustment device for the Hsync
12. detection device for the beginning of a test line
13. evaluation device
14. filter for averaging multiple lines
15. signal phase determination device
16. device for generating an analog-to-digital converter phase
17, 21, 22, 23 additional circuit components
19. frame processing device
20. decimation device

What is claimed is:

1. A method of converting analog video signals to digital video signals, said method comprising:
    a) receiving an analog video signal and providing a digital video signal, a horizontal synchronization signal, and a pixel clock signal;
    b) determining a phase position from a test line of the digital video signal by
        b1) sampling the test line in the output phase position at a sampling frequency which is n times the pixel frequency, and determining, given n phase positions, a first measured value of the video signal for each pixel,
        b2) for two adjacent pixels, forming the differences of the first through the nth phase parameters and summing them over the test line for the first through the nth phase parameters ($\theta_i$, i=1−n),
        b3) determining the phase position from the phase parameters,
    c) changing the phase position, if required, as a function of the phase position determined.

2. The method according to claim 1, wherein the test line has an alternating sequence of bright and dark pixels.

3. The method according to claim 1, wherein a phase segment of each sampling is written by a phase register, and a change of the phase position is effected by incrementing or decrementing the phase register by a predetermined value.

4. The method according to claim 3, wherein the appropriate adjacent sampling is selected if the maximum value of the phase register is exceeded, or if a value falls below the minimum value of the phase register.

5. The method according to claim 4, wherein in step b3) an average of the phase parameters over multiple lines is taken, and the averaged phase parameters are formed; on the basis of this average, an assessment is made as to whether an image with sharp, vertical edges is present, and if no image with sharp, vertical edges is present, no change of the phase position is effected.

6. The method according to claim 5 wherein the averaging over multiple lines is performed by a low-pass filter.

7. The method according to claim 6, wherein the phase parameters are determined as the sum of the individual phase parameters.

8. The method according to claim 1, wherein the sampling frequency is double the pixel frequency.

9. The method according to claim 8, wherein in the step b3) the absolute values of the averaged phase parameters are compared with each other, and based on the comparison a decision is made as to which of the two phase positions is the better phase position.

10. The method according to claim 9, further comprising determining whether the phase position needs to be changed based on a comparison of the absolute value of the averaged phase parameter ($\theta^*_i$) of the better phase position with a quarter of the absolute value of the averaged phase parameter ($\theta^*_k$) of the other phase position.

11. The method according to claim 5, wherein the sampling frequency is triple the pixel frequency.

12. The method according to claim 11, characterized in that said step b3) proceeds as follows:

in a first case, in which the averaged phase parameter ($\theta^*_0$) of the first sampling and the averaged phase parameter ($\theta^*_1$) of the second sampling have the same sign, while the averaged phase parameter ($\theta^*_2$) of the third sampling has a different sign, the first sampling is selected as the best sampling;

in a second case, in which the signs of all the phase parameters are the same, the second sampling is selected as the best sampling;

in a third case, in which the phase parameter of the second and third samplings have the same sign, and the first sampling has a different sign, the third sampling is selected as the best sampling;

in another fourth case, no change of the phase position occurs;

subsequently, in the first through the third case, the absolute value of the averaged phase parameter $|\theta^*_l|$ of the best sampling is compared with the limit (S), and it is recognized that, upon reaching the limit, an image with sharp, vertical edges is present; and the absolute values of the two phase parameters of the non-best samplings are compared, and the absolute value of the smaller phase parameter is compared with a quarter of the absolute value of the best phase parameter, and as a function of this comparison a decision is made as to whether to effect a change of the phase position.

13. A system for converting analog video signals to digital video signals, said system comprising:

a signal input for receiving analog video signals and providing received analog video signals;

a synchronization separator that receives said received analog video signals and generates a reference horizontal synchronization signal;

a phase-locked loop that receives said reference horizontal synchronization signal and generates a pixel clock signal and a horizontal synchronization signal from the reference horizontal synchronization signal;

an analog-to-digital converter to convert said received analog video signals to digital video signals by sampling an nth multiple of the pixel frequency;

a frame adjustment device that receives the digital video signals, the pixel clock signal, the horizontal synchronization signal, and forms differences between the measured values of the sampling of a test line of adjacent pixels and generates phase parameters of the different phase positions by summation of these differences, and determines a phase position of the video signal (G) from the phase parameters, compares the phase position determined with the set phase position, and based on the comparison changes the set phase position as required.

14. The system according to claim 13, comprising a low-pass filter for averaging the phase parameters over multiple lines or frames and outputting the averaged phase parameters.

15. The system according to claim 13, comprising a detection device for establishing a beginning of a test line.

16. The system according to claim 15, wherein a phase register is provided for storing one phase position of the various samplings.

17. A system for converting analog video signals to digital video signals, the system comprising:

means for responsive to an analog video signals for generating a reference horizontal synchronization signal;

a phase-locked loop that receives the reference horizontal synchronization signal and generates a pixel clock signal and a horizontal synchronization signal from the reference horizontal synchronization signal;

an analog-to-digital converter that converts the analog video signals to digital video signals;

means for forming differences between the measured values of the sampling of a test line of adjacent pixels and for generating phase parameters of the different phase positions by summation of these differences, and for determining a phase position of the video signal from the phase parameters, for comparing the phase postion determined with the set phase position, and based on the comparision for changing the set phase position as required.

* * * * *

UNITED STATES PATENT AND TRADEMARK OFFICE
CERTIFICATE OF CORRECTION

PATENT NO. : 7,183,961 B2
APPLICATION NO. : 10/205589
DATED : February 27, 2007
INVENTOR(S) : Jochen Frensch It is certified that error appears in the above-identified patent and that said Letters Patent is hereby corrected as shown below:

On Title Page item 57
In the Abstract
Line 2, delete "that" and insert --and--
Line 15, after "phase" insert --position--

Column 1
Line 18, after "precision of" delete "on"
Line 19, delete "the pixel precision of"
Line 24, delete "which" and insert --that--
Line 29, before "manifest" delete "are"
Line 48, delete "which" and insert --that--

Column 2
Line 66, delete "evalution" and insert --evaluation--

Column 3
Line 15, before "evaluation" insert --the--
Line 22, after "Start" insert --on the line 108--

Column 4
Line 9, before "analog" insert --the--
Line 67, delete "block" and insert --step--

Column 5
Line 10, delete "block" and insert --step--

Column 6
In the claims, claim 1, line 27, delete "said" and insert --the--
In the claims, claim 2, line 46, delete "wherein" and insert --where--
In the claims, claim 3, line 48, delete "wherein" and insert --where--
In the claims, claim 4, line 52, delete "wherein" and insert --where--
In the claims, claim 5, line 54, delete "wherein" and insert --where--
In the claims, claim 6, line 63, delete "5wherein" and insert --5 where--
In the claims, claim 7, line 65, delete "wherein" and insert --where--

Column 7
In the claims, claim 8, line 1, delete "wherein" and insert --where--
In the claims, claim 9, line 3, delete "wherein" and insert --where--
In the claims, claim 11, line 14, delete "wherein" and insert --where--
In the claims, claim 12, line 16, delete "characterized in"

UNITED STATES PATENT AND TRADEMARK OFFICE
CERTIFICATE OF CORRECTION

PATENT NO. : 7,183,961 B2
APPLICATION NO. : 10/205589
DATED : February 27, 2007
INVENTOR(S) : Jochen Frensch

It is certified that error appears in the above-identified patent and that said Letters Patent is hereby corrected as shown below:

<u>Column 7</u>
In the claims, claim 12, line 17, delete "that said" and insert --where--
In the claims, claim 13, line 47, delete "said" and insert --the--
In the claims, claim 13, line 50, delete "said" and insert --the--

<u>Column 8</u>
In the claims, claim 13, line 1, delete "said" and insert --the--
In the claims, claim 13, line 6, delete "said" and insert --the--
In the claims, claim 13, line 16, delete "(G)"
In the claims, claim 16, line 27, delete "wherein" and insert --where--
In the claims, claim 17, line 49, delete "postion" and insert --position--
In the claims, claim 17, line 50, delete "comparision" and insert --comparison--

Signed and Sealed this

Twenty-fourth Day of April, 2007

JON W. DUDAS
*Director of the United States Patent and Trademark Office*